April 27, 1926. 1,582,696
O. SCHLENSTEDT
TUBE MAKING MACHINE
Filed April 25, 1925
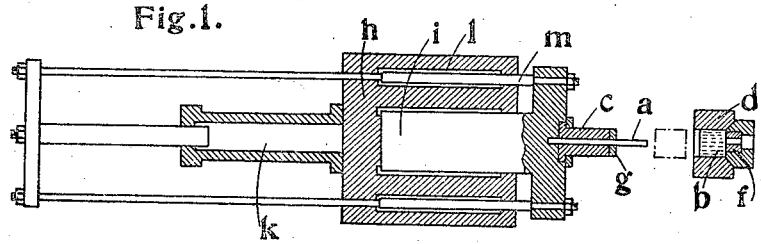
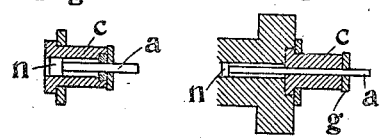
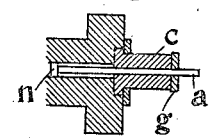
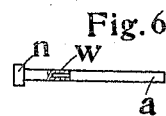
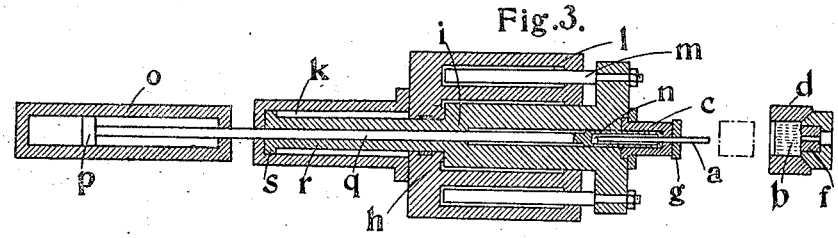
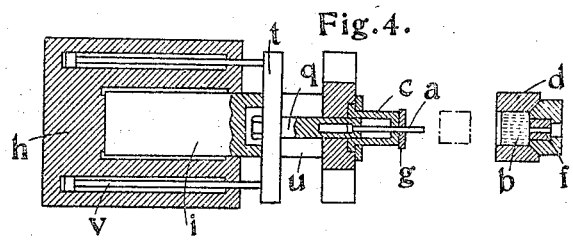
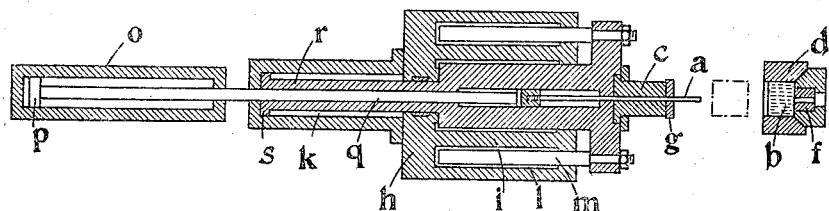
Inventor
Oswig Schlenstedt
by
W. E. Evans
Attorney.

Patented Apr. 27, 1926.

1,582,696

UNITED STATES PATENT OFFICE.

OSWIG SCHLENSTEDT, OF MULHEIM-RUHR-SPELDORF, GERMANY, ASSIGNOR TO HYDRAULIK GESELLSCHAFT MIT BESCHRÄNKTER HAFTUNG, OF DUISBURG, GERMANY, A GERMAN COMPANY.

TUBE-MAKING MACHINE.

Application filed April 25, 1925. Serial No. 25,863.

*To all whom it may concern:*

Be it known that I, OSWIG SCHLENSTEDT, a citizen of the German Republic, residing at 64 Hundsbuschstrasse, Mulheim-Ruhr-Speldorf, Germany, have invented certain new and useful Improvements Relating to Tube-Making Machines, of which the following is a specification.

The present invention relates to a press for making tubes of the type comprising a mandrel, die and ram. In such presses during the operation of pressing out the work the mandrel is subjected by the flowing metal to great stresses which, in presses in which the mandrel is connected to the ram or to a hydraulic piston that especially serves for reciprocating the mandrel, often result in the fracture of the latter.

The invention especially relates to presses of the type referred to in which the mandrel is mounted so as to be capable of free movement under the influence of the flowing metal during the operation of pressing out the work.

According to the invention the mandrel is mounted freely movable in the axial direction whereby the mandrel alone is subject to the free play of the extruded metal, that is, the mandrel is capable of moving with the extruded metal to an extent that is determined by the movement of the metal within the holder, and a head or the like is provided upon the rear end of the mandrel so that it may be retracted on the withdrawal of the ram.

In the accompanying drawing,

Figure 1 is a central section through a press illustrating the invention in one form;

Fig. 2 is a central section through a ram showing an axially movable mandrel having a head fitting in a bore in the ram;

Fig. 3 is a central section through a press in which a rod has a limited axial movement in the pressing member, and a headed mandrel has a lost-motion connection with the rod;

Fig. 4 is a similar view through another form of press embodying a rod having a limited axial movement in the pressing member and a headed mandrel having a lost-motion connection with the rod;

Fig. 5 is a central section through part of a pressing member, showing a mandrel having a head adapted to engage the rear end of the ram;

Fig. 6 is a side view of a mandrel made in two parts, one having a head; and,

Fig. 7 is a central section through a modified form of press in which a rod, having a head, has a limited axial movement in the pressing member and the mandrel is secured to said rod.

In Figures 1 to 6 of the accompanying drawings there are illustrated a number of constructions of a tube press provided with a freely movable mandrel. In all the figures, $a$ is the mandrel, $b$ is the raw material to be pressed out, $c$ is the ram which presses out the raw material $b$, $d$ is the holder for the raw material, and $f$ is the die or matrix which provides an annular opening for the passage of the raw material being pressed by the ram $c$. $g$ is a pressure disc, which is placed in the usual way in front of the end face of the ram $c$. $h$ is the pressure cylinder of the tube press, and $i$ is the corresponding pressure piston which transmits the pressure applied, to the raw material $b$ by means of the ram $c$. A return cylinder $k$ is provided for withdrawing the pressure piston $i$ in known manner. The perforating cylinders $l$ with the corresponding pistons $m$, attached to the pressure piston $i$, are used for moving the pressure piston $i$ formed and for perforating the block $b$.

A simple form of mechanism is shown in Fig. 1 in which a plain mandrel or punch is loosely inserted into a corresponding hole in the ram $c$, so that it can freely move in the direction in which pressure is applied. The mechanism operates as follows:

The block $b$ is passed into the holder $d$, whereupon water under pressure is admitted to the cylinders $l$, whereby the pressure piston $i$ is moved forward without load, together with the ram $c$ and the mandrel or punch $a$, whereupon the block $b$ is perforated. This operation causes the mandrel or punch $a$ to penetrate the die or matrix $f$ and the pressure disc $g$ to come into contact with the perforated block $b$. During this movement of the pressure piston $i$, the pressure cylinder $h$ is filled with water at low pressure. Thereupon the pressure cylinder $h$ is placed under pressure, whereupon the operation of pressing out the block $b$ commences.

In this operation the work exerts pressure upon the wall of the holder *d* and upon the surface of the mandrel *a*, and such pressure results in friction upon the mandrel as the work tends to move along the surface of the mandrel, and to take the mandrel with it. The provision of the mandrel *a* so as to move in the direction of its axis allows the mandrel to yield to this effort of the work unaffected by any external agency, and to take part in the movement of the work. In order that the mandrel may be withdrawn from the tube produced, on the return movement of the pressure piston, the mandrel *a* is provided at its rear end with a head *n* which may be integral or screwed on and which is guided in a corresponding bore of the tubular ram *c*. As the piston returns the mandrel is likewise drawn out by the forward end of the ram, the bore of which corresponds to the diameter of the mandrel, and it is thus withdrawn from the pressed tube. To prevent the tube from following the mandrel as the latter is being withdrawn a gripping device of any desired construction, not illustrated in the drawings, may be provided at the rear of the press. For this purpose the box of the holder *d* may be somewhat larger near the die or matrix *f*, so that the remainder of the raw material within the holder *d* and which is still connected to the tube is held fast as the mandrel is being withdrawn.

Figure 3 illustrates a special cylinder *o* for advancing and returning the mandrel *a*. A rod *q* passes centrally through the pressure piston *i* which is reduced and extended at the rear, and the rod *q* is provided for transmitting the movement of the advancing and returning piston *p* to the mandrel *a*. The mandrel *a* is provided with a head *n* and is inserted in the rod *q* in such manner that it can make the desired axial movement without being obligated to take the rod with it. The piston *p* is used on the one hand for perforating the work block and on the other hand for withdrawing the mandrel from the pressed tube. For this purpose pressure is exerted first upon one side of the piston and then upon the other side alternately. In the arrangement according to Figure 3, the pressure cylinder *h* is set for waste water only after the mandrel is withdrawn from the pressed tube, for the purpose of gripping the remainder of the work and the tube during the withdrawal of the mandrel by the ram *c*. The pistons *m* have for their only purpose in this construction to advance the pressure piston until it comes into contact with the pressure disc *g* against the perforated work block.

The extension *r* of the pressure piston *i* which is necessary for allowing the axial movement of the rod *q* may be provided with a piston *s*, which is packed in the return cylinder *h* and may be used as a returning piston for the pressure piston and the ram.

A further modification is illustrated in Figure 4. According to the construction illustrated in this figure the rod *q* is fixed in a cross-head *t* which moves in the slot *u* provided in the pressure piston *i*, and is driven by the perforating and returning cylinders *v*. The relative movement of the cross-head *t* with respect to the pressure piston *i*, that is to say the movement of the cross-head in the slot *u*, has for its object to withdraw the mandrel from the pressed tube by the cylinders *v*, and in doing so to hold the tube firmly by the pressure piston *i* and the ram *c*, in the manner described with reference to Figure 3. The cylinders *v* may be used after the withdrawal of the mandrel from the tube for continuing the movement of the cross-head *t* at the same time as the returning cylinders are used for the pressure piston *i*.

The pressure piston may be provided to move without load by admitting water under low pressure into the pressure cylinder *h*. In this case the perforating cylinders only require to be put under pressure at the commencement of perforation: or they may be dispensed with entirely if the water pressure exerts a sufficiently high pressure upon the pressure piston *i* to perforate the block.

As is shown in Figure 5, the mandrel *a* may be made of such a length that the head used for withdrawing the mandrel is limited in movement by the rear face of the ram *c*. The disadvantage of the greater length in this form of mandrel is counterbalanced by the advantage of a stronger ram *c*; the bore of the ram requires to be no more than equal to the diameter of the mandrel.

As illustrated in Figure 6 the mandrel may be made divided in such manner that a plain mandrel is inserted in an extension *w* provided with a head *n*, but this extension does not enter the pressed tube during the pressing operation.

Figure 7 illustrates a modification in which the lost motion or the capacity for movement axially is not provided in the mandrel holder, but in the cylinder *o* of the rod *q*. The return side of the piston in the cylinder *o* is in this case connected with the waste water pipe when the tube is being pressed out. The free movement of the mandrel *a* is somewhat affected by the resistance of the water issuing from the cylinder *o*, and by the friction of the piston, but this arrangement has the advantage intended over the devices already in use although not to the extent attained in the other modifications hereinbefore described.

The arrangement of mandrel illustrated in Figure 7 may be used in the construction shown in Figure 4, with suitable obvious changes.

The modifications of construction hereinbefore described and illustrated in the accompanying drawing are intended merely as examples.

It will be understood that the invention may be used on tube making presses of other construction, provided the purpose intended by the invention is secured, that is, to allow the mandrel during the pressing operation to move forward merely by the effect of the work uninfluenced by any outside agency.

By the use of apparatus according to the invention complete work blocks can be pressed out into tubes in a tube press, and before beginning the pressing operation the work blocks can be perforated in the holder by the mandrel described, but the work blocks may be perforated and worked up before introduction into the holder.

I claim:—

1. A tube press of the die and mandrel type comprising a pressing member composed of a piston and ram, a die, and a mandrel concentrically mounted in said member and having a lost-motion connection therewith permitting limited axial movement of the mandrel with respect to said member and preventing the separation of the mandrel from the ram when the latter is withdrawn from the die.

2. A tube press of the die and mandrel type comprising a pressing member composed of a piston and ram, a die, and a mandrel concentrically mounted in said member and movable axially with respect thereto, said mandrel having a head at its inner end adapted to prevent the withdrawal of the mandrel from the ram when the latter is withdrawn from the die.

3. A tube press of the die and mandrel type comprising a pressing member composed of a piston and ram, a die, a rod, and a mandrel connected to the rod, said rod and mandrel being axially mounted in said member and having a lost-motion connection therewith, permitting limited axial movement of the rod and mandrel with respect to said member and preventing withdrawal of the mandrel from the ram when the latter is withdrawn from the die.

4. A tube press of the die and mandrel type comprising a pressing member composed of a piston and ram, a die, a rod, a mandrel connected to the rod, said rod and mandrel being axially mounted in said member and having a lost-motion connection therewith, permitting limited axial movement of the rod and mandrel with respect to said member and preventing withdrawal of the mandrel from the ram when the latter is withdrawn from the die, and means for moving said rod independently of said member.

5. A tube press of the die and mandrel type comprising a pressing member composed of a piston and ram, a die, a rod concentrically mounted in said member and having a lost-motion connection with said member permitting limited axial movement of the rod with respect thereto, and a mandrel movable axially in the ram and having a lost-motion connection with the rod.

6. A tube press of the die and mandrel type comprising a pressing member composed of a piston and ram, a die, a rod concentrically mounted in said member and movable axially with respect thereto and a mandrel movable axially in the ram and having a lost-motion connection with said rod.

7. A tube press of the die and mandrel type comprising a pressing member composed of a piston and ram, a die, a rod concentrically mounted in said member and movable axially with respect thereto and a mandrel movable axially in the ram and movable relatively to the rod, said mandrel having a head adapted to prevent its withdrawal from the rod and ram when the latter is withdrawn from the die.

OSWIG SCHLENSTEDT.